(No Model.) 2 Sheets—Sheet 1.

H. EPPING.
CRUCIBLE FURNACE.

No. 356,061. Patented Jan. 11, 1887.

Witnesses:
Alma N. Price
Geo. Stewart

Inventor.
Henry Epping
per Josiah W. Ells
attorney (No Model.) 2 Sheets—Sheet 2.

H. EPPING.
CRUCIBLE FURNACE.

No. 356,061. Patented Jan. 11, 1887.

Witnesses:
Alma H. Price
Geo. Stewart

Inventor:
Henry Epping
per Josiah W. Ells
attorney

UNITED STATES PATENT OFFICE.

HENRY EPPING, OF PITTSBURG, PA., ASSIGNOR OF FOUR-FIFTHS TO W. H. CARPENTER, EDWARD FRAUENHEIM, L. VILLSACK, AND H. KABER.

CRUCIBLE-FURNACE.

SPECIFICATION forming part of Letters Patent No. 356,061, dated January 11, 1887.

Application filed November 9, 1885. Serial No. 182,309. (No model.)

*To all whom it may concern:*

Be it known that I, HENRY EPPING, a citizen of the United States, residing at Pittsburg, in the county of Allegheny and State of Pennsylvania, have made a new and useful Improvement in Crucible-Furnaces Designed for Melting and Refining Metals in Pots or Crucibles, of which the following is a specification.

I will proceed to describe the same by reference to the accompanying drawings, wherein—

Figure 1:
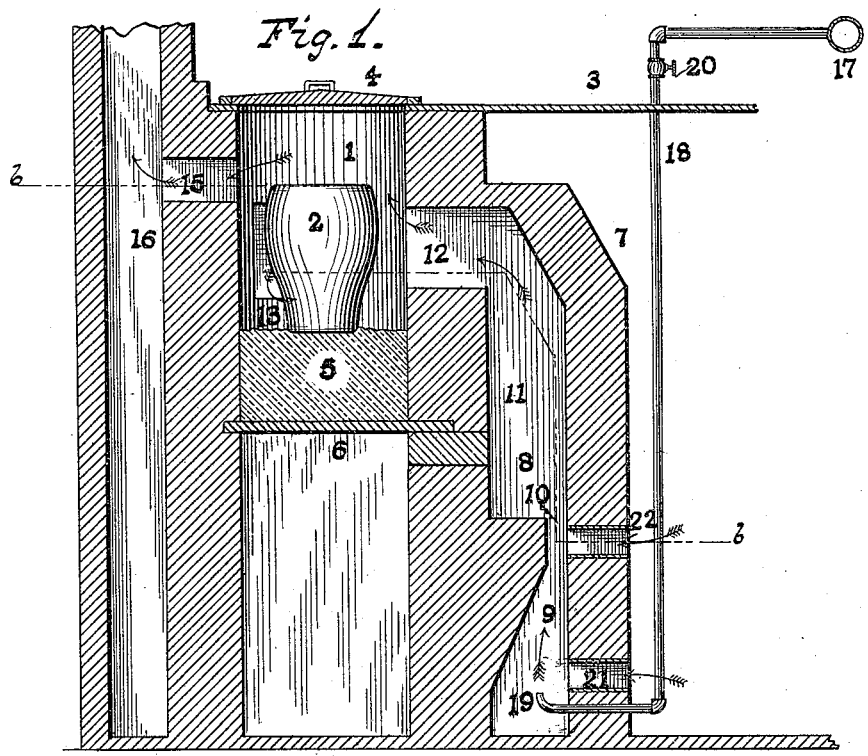
Figure 2:
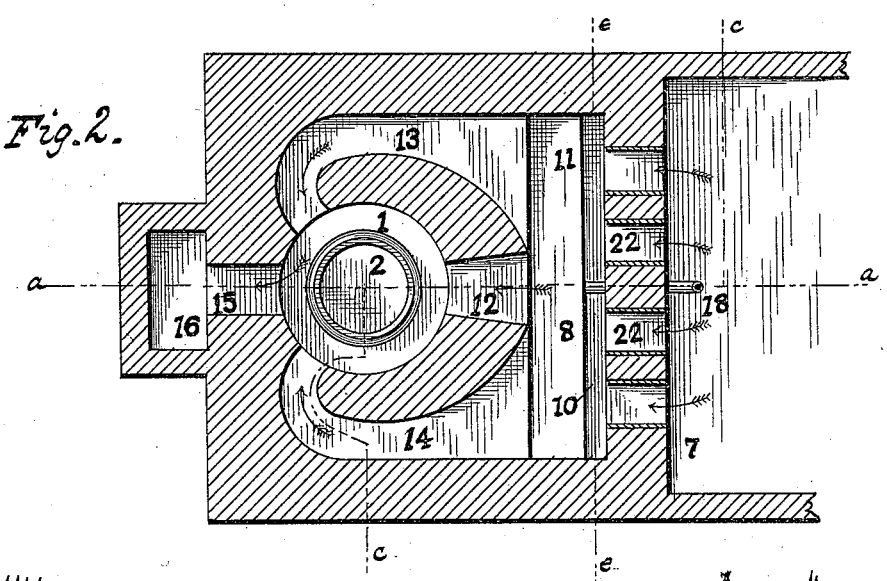
Figure 3:
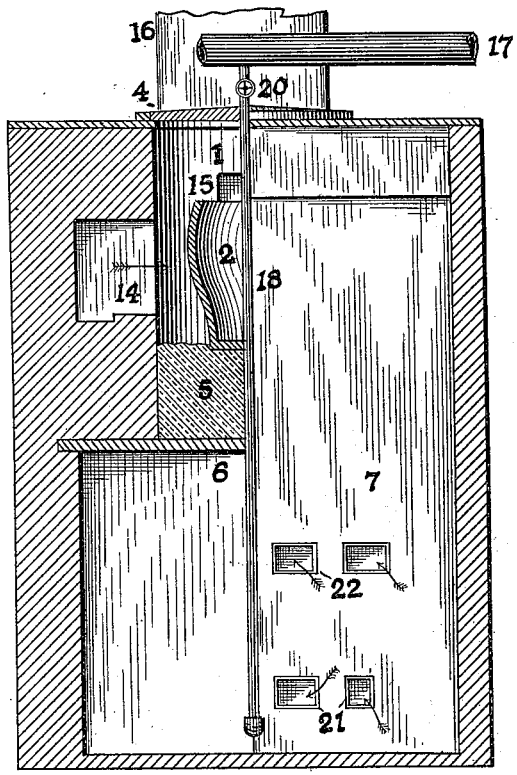
Figure 4:
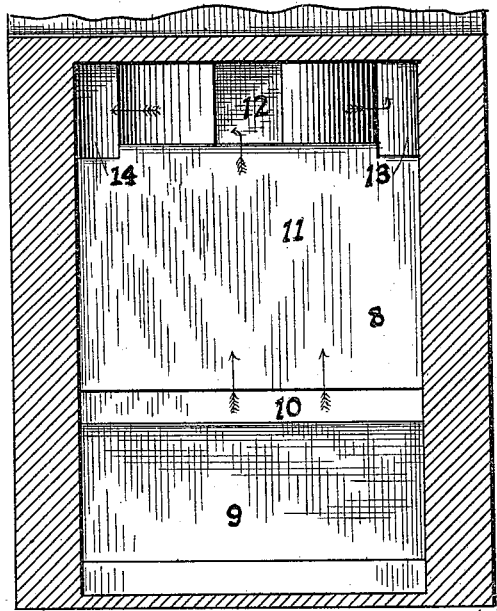

Figure 1 represents a transverse vertical section on the line *a a* of Fig. 2; Fig. 2, a transverse section on the bent line *b b* of Fig. 1; Fig. 3, a front elevation of the furnace, partly in vertical section, on the bent line *c c* of Fig. 2; Fig. 4, a vertical section of the same on the line *e e* of Fig. 2.

I build my improved furnace of any requisite size and form, so that the body of the structure shall comprise a working or melting chamber, 1, of sufficient depth and dimensions to contain a pot or crucible, 2, and leave a space around and over it for the action and unobstructed passage of a flame. For convenience, the top of this melting-chamber 1 is on a level with the workshop-floor 3, and is provided with a removable lid or cover, 4, after the manner of furnaces in use among brass-founders generally. The bottom 5 of this melting-chamber 1 consists of a thick mass of clay, sand, bricks, or other refractory and heat-sustaining material supported by a heavy iron plate, 6, that may be laid upon the usual grate-bars, where they exist in an old furnace altered and adapted to subserve the object of my invention.

Forming part of this furnace, but separated therefrom a short distance, is a strong wall, 7, inclosing an intervening space or vertical chamber, 8, the lower part, 9, of which is gradually contracted upward to or near the middle of the space, forming a narrow passage-way, 10, leading into the upper part, 11, that by three branch flues communicates with the melting-chamber 1 at or near equidistant points. One of these flues is simply a straight opening, 12, arranged to direct the flame against the front of the pot or crucible 2, and the other flues, 13 14, are curved around to enter the melting-chamber at opposite sides, nearly behind the pot. Midway between the curved flues is a short passage-way, 15, into the chimney 16, for carrying off the waste products of combustion.

Above the floor of the workshop and outside the furnace is a large pipe, 17, connected with a gas-well or source of gas under pressure, and from this main pipe a small branch pipe, 18, projects outwardly, and by suitable bends is continued down and into the lowermost chamber, 9, at or near its bottom, where it terminates in an open upturned end, 19, through which gas can flow, regulated and controlled by a small valve or cock, 20, near the top of said branch pipe.

Through the front wall, 7, of the furnace, and just above the lower end of the gas-pipe 18, are open ducts 21, for supplying air to the ingoing gas at that point, which, on being ignited, will produce a flame that, in ascending, will meet with an additional supply of air through other and similar ducts, 22, on its way through the contracted passage 10 into the upper chamber, 11, whereby a better combustion takes place and a greater amount of heat is generated, being augmented and intensified in that respect as it expands and flows onward into the melting-chamber, where it circulates around the crucible at its maximum degree of heat, soon bringing any ordinary metal contained within the crucible to a molten or fluid condition, with less oxidation than by any other means or fuel heretofore in use among brass or steel melters.

I am aware that it is not new in crucible-furnaces to employ an air and a gas mixing chamber outside of the crucible-chamber and to conduct the flame into the latter chamber through different passages; and therefore I disclaim such device. My object is to improve, simplify, and to render more perfect such furnaces.

Having thus briefly described my invention, I claim—

1. In a gas crucible-furnace, the combination, with the crucible-chamber, of the direct horizontal passage and the lateral curved passages for the products of combustion, and a vertical chamber for the mixture of the gas and air, substantially as described.

2. In a gas crucible-furnace, the combination, with the crucible-chamber, of the direct and laterally-curved passages leading therein, the outlet-passage to the uptake, a vertical mixing-flue contracted as described, the air-inlet passages opposite and below said contraction, and a gas-supply pipe terminating in said flue opposite the lower air-supply passages, substantially as described.

3. The combination, in a furnace of the character described, of the gas and air mixing and combustion chambers 9 and 11, the intermediate contracted passage opposite air-inlets, the air-inlets leading into the primary combustion-chamber, the air-inlets at the said contracted passage, the broad passage 12, the side and direct passages leading into the crucible-chamber, and the outlet leading therefrom into an uptake, all constructed and adapted to operate substantially as and for the purposes described.

HENRY EPPING.

Witnesses:
 JOSIAH W. ELLIS,
 W. H. CARPENTER.